(12) United States Patent
Nelson

(10) Patent No.: US 11,524,480 B2
(45) Date of Patent: Dec. 13, 2022

(54) ADAPTIVE MICROTEXTURING OF A COMPOSITE MATERIAL

(71) Applicant: Rolls-Royce Corporation, Indianapolis, IN (US)

(72) Inventor: Scott Nelson, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 655 days.

(21) Appl. No.: 16/445,848

(22) Filed: Jun. 19, 2019

(65) Prior Publication Data

US 2019/0389171 A1    Dec. 26, 2019

Related U.S. Application Data

(60) Provisional application No. 62/688,675, filed on Jun. 22, 2018.

(51) Int. Cl.
| | | |
|---|---|---|
| *B32B 5/02* | (2006.01) | |
| *B29C 59/02* | (2006.01) | |
| *B32B 5/26* | (2006.01) | |
| *C04B 35/80* | (2006.01) | |

(52) U.S. Cl.
CPC ............ *B32B 5/024* (2013.01); *B29C 59/022* (2013.01); *B32B 5/26* (2013.01); *B29C 2059/023* (2013.01); *B32B 2255/20* (2013.01); *B32B 2260/021* (2013.01); *B32B 2260/04* (2013.01); *B32B 2262/105* (2013.01); *C04B 35/80* (2013.01)

(58) Field of Classification Search
CPC ... B05D 3/002; B32B 5/024; B29C 2059/023; B29C 59/022; Y10T 442/3089; Y10T 442/3098
See application file for complete search history.

(56) References Cited

U.S. PATENT DOCUMENTS

| | | | | |
|---|---|---|---|---|
| 5,435,889 | A  * | 7/1995 | Dietrich | C04B 41/5025 427/292 |
| 5,648,127 | A  * | 7/1997 | Turchan | F41A 21/04 427/904 |
| 8,357,454 | B2 | 1/2013 | Kulkarni et al. | |
| 2008/0274336 | A1* | 11/2008 | Merrill | C04B 41/5027 428/168 |
| 2009/0017260 | A1* | 1/2009 | Kulkarni | C23C 28/3455 428/161 |
| 2010/0098906 | A1 | 4/2010 | Bongiovanni et al. | |
| 2014/0272310 | A1 | 9/2014 | Lazur et al. | |
| 2018/0029944 | A1* | 2/2018 | Subramanian | F01D 11/122 |

* cited by examiner

*Primary Examiner* — Jeremy R Pierce
(74) *Attorney, Agent, or Firm* — Shumaker & Sieffert, P.A.

(57) ABSTRACT

An article including a composite including a subsurface structure and a second phase of material forming a coating on the subsurface structure. The coating includes a first region defining a first plurality of microtextures in an outer surface of the coating, where the first plurality of microtextures include an average bore width of less than about 250 micrometers (μm) and a first average bore depth, and a second region positioned adjacent to the first region wherein the coating defines a second plurality of microtextures on the outer surface of the coating, where the second plurality of microtextures include an average bore width of less than about 250 μm and a second average bore depth less than the first average bore depth.

19 Claims, 7 Drawing Sheets

US 11,524,480 B2

ADAPTIVE MICROTEXTURING OF A COMPOSITE MATERIAL

This application claims the benefit of U.S. Provisional Application No. 62/688,675, filed Jun. 22, 2018, which is incorporated herein by reference in its entirety.

TECHNICAL FIELD

The present disclosure relates to coating interfaces, and more particularly, but not exclusively, to coating interfaces on fiber reinforced ceramic matrix composites.

BACKGROUND

Ceramic matrix composite (CIVIC) materials may be useful in a variety of contexts where mechanical and thermal properties are important. For example, components of high temperature mechanical systems, such as gas turbine engines, may be made from CMCs. CMCS may be resistant to high temperatures, but some CMCs may react with some elements and compounds present in the operating environment of high temperature mechanical systems, such as water vapor. These reactions may damage the CMC and reduce mechanical properties of the CMC, which may reduce the useful lifetime of the component. A CMC component may be coated with an environmental barrier coating, which may reduce exposure of the CMC component to elements and compounds present in the operating environment of high temperature mechanical systems.

SUMMARY

In some examples, the disclosure describes techniques for improving the adhesion between a composite and an applied coating layer by forming a plurality of microtextures such as microchannels or depressions on the surface of the composite using an adaptive mircotexturing process. The composite may include a subsurface structure and a coating on the subsurface structure. For example, the subsurface structure may include a woven reinforcement material and the coating may include matrix material that is over the woven reinforcement material (i.e., towards an outer surface of the composite). In some examples, the depth of the respective microtextures may be selected based on the geometry of the subsurface structure underlying coating of the composite to form microtextures with increased depth without adversely damaging or exposing the subsurface structure within the composite.

In some examples, the disclosure describes an article that includes a composite including a subsurface structure and a second phase of material forming a coating on the subsurface structure. The coating includes a first region defining a first plurality of microtextures in an outer surface of the coating, where the first plurality of microtextures include an average bore width of less than about 250 micrometers ($\mu m$) and a first average bore depth, and a second region positioned adjacent to the first region where the coating defines a second plurality of microtextures on the outer surface of the coating, where the second plurality of microtextures include an average bore width of less than about 250 $\mu m$ and a second average bore depth less than the first average bore depth.

In some examples, the disclosure describes a method that includes imaging an outer surface of a composite that includes a subsurface structure and a second phase of material forming a coating on the subsurface structure that defines the outer coating; based imaging the outer surface of a composite, sectioning the outer surface into at least a first region and a second region adjacent to the first region, where the first region has a larger average coating thicknesses of the coating than the second region; forming a first plurality of microtextures on the outer surface of the coating within the first region, the first plurality of microtextures having an average bore width of less than 250 $\mu m$ and a first average bore depth; and forming a second plurality of microtextures on the outer surface within the second region, the second plurality of microtextures having an average bore width of less than 250 $\mu m$ and a second average bore depth less than the first average bore depth.

The details of one or more examples are set forth in the accompanying drawings and the description below. Other features, objects, and advantages will be apparent from the description and drawings, and from the claims.

DETAILED DESCRIPTION

The disclosure describes articles and techniques for improving the adhesion between a composite component (e.g., a ceramic or a ceramic matrix composite (CMC)) that includes a woven-fiber reinforcement material) and an applied coating on the composite by forming a plurality of microtextures such as microchannels or depressions in the surface of the coating using an adaptive texturing process. The composite may include a subsurface structure and a coating on the subsurface structure. For example, the subsurface structure may include a woven reinforcement material and the coating may include matrix material that is over the woven reinforcement material (i.e., towards an outer surface of the composite). Creation of the microtextures in the surface of the composite can improve the bonding strength of the subsequent coating (e.g., a bond coat) by constraining stress between the two materials during subsequent thermal cycling as well as creating mechanical interlocks between the two materials. In some examples, increasing the depth of a respective microtextures will correspond with an increase in the bonding strength. However, increasing the depth of the of the respective microtextures increases the risk of inadvertently exposing portions of the subsurface structure, which may increase the risk of environmental damage to the subsurface structure, may reduce mechanical properties of the composite, or both.

In some examples, the disclosure describes an adaptive texturing process that uses a non-destructive evaluation technique to image the top surface of the composite. Based on the image of the composite, the systems may implement an automated texturing process to produce a plurality of microtextures in the surface of the component. The system may determine respective depths of the microtextures based on the acquired image such that the system defines at least two different regions of microtextures having different respective average bore depths corresponding to different regions having different coating depths over the subsurface structure.

In some examples, the system may form the microtextures using a laser ablation system to produce the respective depressions or channels. Using laser ablation to produce the microtextures may reduce the chance of the subsurface structure cracking during the texturing processing (e.g., compared to using mechanical machining to form the microtexture in a surface of a CMC). Laser ablation may also result in a cleaner outer surface compared to other processing techniques, which may also improve the adhesion between the composite and a subsequent coating layer.

Figure 1A:
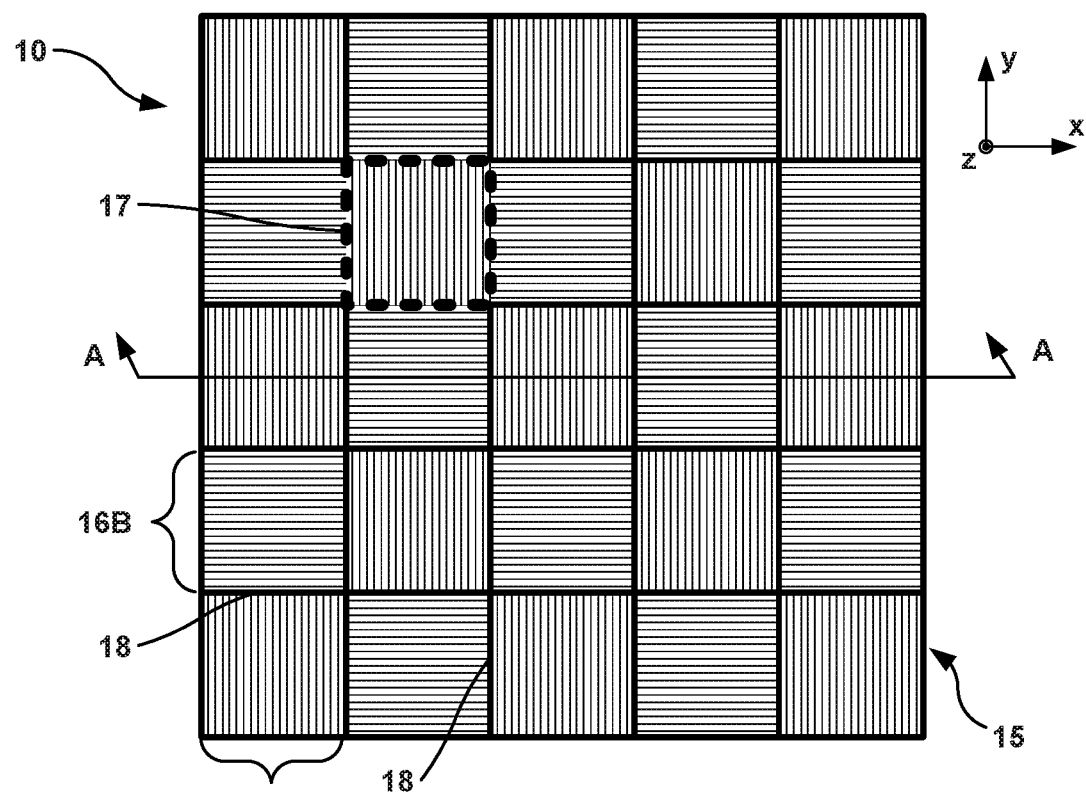
FIGS. 1A and 1B are schematic views of an example woven fiber preform that may be used to produce a composite component.
Figure 1B:
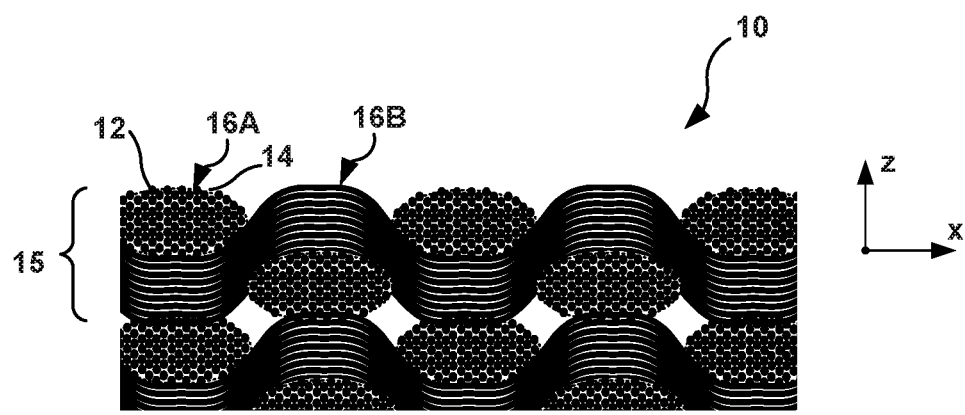

FIGS. 1A and 1B are schematic views of an example woven fiber preform 10 that may be used to produce a composite component (e.g., fiber-reinforced ceramic matrix composite). FIG. 1A is top-down view of woven fiber preform 10 and FIG. 1B is a cross-sectional view of woven fiber preform 10 taken through line A-A of FIG. 1A. Woven fiber preform 10 is an example of a subsurface structure in a composite.

Woven fiber preform 10 may include a plurality of fibers 12 and a fiber interface material 14, which may be a binder material that helps secure fibers 12 together. Fibers 12 may be bundled together in yarns or tows 16 and woven together. If fibers 12 are twisted together the bundle is commonly referred to as a yarn, and if fibers 12 are remain untwisted the bundle is commonly referred to as a tow. The below examples describe fibers 12 as being bundled as tows 16, however fiber 12 may likewise be incorporated into woven fiber preform 10 as yarns or other suitable groupings.

Each tow 16 may represent a plurality of individual fibers 12 bundled together. In some examples, each tow 16 may include hundreds to thousands of individual fibers 12 (e.g., approximately 500 individual fibers 12). The individual fibers 12 may include continuous or discontinuous fibers or the like composed of carbon (C), silicon carbide (SiC), or precursor materials (e.g., materials that reduce to C or SiC through subsequent thermal processing).

Tows 16 of woven fiber preform 10 may be combined in any suitable fashion including, for example, combined as a weave, braid, knit, or other interlaced pattern. As shown in FIGS. 1A and 1B, in some examples, woven fiber preform 10 may include multiple layers of woven tows 16 (e.g., woven fabric layer 15) stacked and secured together using any suitable technique. In some examples, one or more of the woven layers may be mechanically bound together. In some examples, as described further below, fiber interface material 14 may help secure tows 16 and/or the different layers of fibers 12 together.

In some examples, each respective layer of woven fiber preform 10 may include a plurality of warp tows 16A (e.g., those tows extending in the vertical direction or in the direction of the y-axis of FIGS. 1A and 1B) woven against a plurality of weft tows 16B (e.g., those tows extending in the horizontal direction or in the direction of the x-axis of FIGS. 1A and 1B). The designation of "warp" or "weft" tows 16 is used to differentiate between the two different weave directions and is not intended to imply a specific weave pattern, a particular deflection of respective tows 16, a particular size of tows 16, or particular type of fibers 12 within respective tows 16. In some examples, warp tows 16A and weft tows 16B may include the same number of fibers 12 while in other examples, warp tows 16A and weft tows 16B may include a different number of fibers 12. In some examples, tows 16 may be characterized as a tape or ribbon tows where fibers 12 within a respective tow 16 are spread wide and thin so that tow 16 defines a relatively small tow thickness compared to the width of tow 16.

Warp and weft tows 16A and 16B may be woven together in any suitable weave pattern. FIG. 1A illustrates warp and weft tows 16A and 16B in a plain weave pattern. However, woven fiber preform 10 may also be made with a different weave pattern other than that shown in FIG. 1A, including, for example, a twill weave, a satin weave (e.g., harness number of 3 or more), a basket weave, a mock lend weave, or the like. In some examples, woven fiber preform 10 may include a 5 harness satin weave.

Within a respective woven layer, each tow of tows 16 may be characterized as transitioning between a riser configuration (e.g., where a respective warp tow 16A passes over a weft tow 16B as seen from above in FIG. 1A or vice versa) and a sinker configuration (e.g., where a respective warp tows 16A passes under a weft tow 16B as seen from above in FIG. 1A or vice versa). Merely for illustrative purposes, in the outlined region 17 of FIG. 1A, a warp tow of warp tows 16A is in the riser configuration and weft tow of weft tows 16B is in the sinker configuration. In examples where tows 16 are woven tightly together (e.g., such that little or no open spaces or cells are produced between adjacent warp tows 16A or adjacent weft tows 16B), each respective tow of tows 16 may be characterized as alternating between being a riser and being a sinker configuration based on an overhead view of the layer (e.g., the perspective of FIG. 1A).

Tows 16 may also be characterized as defining a plurality of intersections 18, which refer to the boundary lines where a respective warp or weft tow 16A or 16B crosses or interests to begin passing underneath a corresponding weft or warp tow 16B or 16A as observed from overhead (e.g., as observed from the perspective of FIG. 1A). In the outlined region 17 of FIG. 1A, the four dashed boundary lines defining region 17 may each be characterized as intersections 18. In some examples, such as in a plain weave configuration, intersections 18 may also be characterized as including the boundary line between adjacent warp tows 16A or between adjacent weft tows 16B as observed from overhead (e.g., as observed from the perspective of FIG. 1A).

In some examples, woven fiber preform 10 and may include a fiber interface material 14, such as a binder material that helps secure fibers 12 into a respective tow of tows 16. In some examples, fiber interface material 14 additionally may help secure together tows 16 within a given fabric layer 15 as well as help secure adjacent fabric layers together within woven fiber preform 10. Suitable fiber interface materials 14 may include, for example, a binder material such as polyethylene glycol, acrylate co-polymers, latex co-polymers, polyvinylpyrrolidone co-polymers, polyvinyl butyral, or the like that may be converted into a pyrolytic material such as pyrolytic carbon (PyC) through subsequent thermal processing. In some examples, fiber interface material 14 may help rigidize woven fiber preform 10, density woven fiber preform 10 during subsequent thermal processing, or combinations thereof. In some examples, as described further below, fiber interface material 14 after thermal processing may contribute to the matrix material of the resultant composite component.

Fiber interface material 14 may be added to fibers 12 using any suitable technique. For example, a binder material may be initially applied to a layer of woven fibers 12 as a coating. The woven fabric layers may then be stacked together, and the stack may be thermally processed under optional compression to covert fiber interface material 14 to a pyrolytic material (e.g., PyC or SiC). Additionally, or alternatively, fibers 12 and fiber interface material 14 may be incorporated as a tow of tows 16 which is subsequently woven into a fabric layer.

Woven fiber preform 10 may be further processed to introduce additional interface or reinforcement material into woven fiber preform 10 to help rigidize the structure for subsequent processing. For example, woven fiber preform 10 may be subjected to an initial chemical vapor infiltration (CVI) or chemical vapor depositions (CVD) cycle to deposit one or more ceramic reinforcement materials on fibers 12, tows 16, or both, such as boron nitride (BN), boron carbide (BC), silicon carbide (SiC), silicon nitride ($Si_3N_4$), alumina ($Al_2O_3$), aluminosilicate, silicon carbide aluminum boron silicide, silica ($SiO_2$), or the like. The additional ceramic reinforcement materials may help strengthen woven fiber preform 10 to reduce potential damage (e.g., delamination) of the woven fiber preform 10 during subsequent processing (e.g., slurry infiltration), may reduce chemical reactions between materials of fibers 12 and subsequently introduced matrix materials, may provide a material that reduces a chance of pull-out of fibers 12 or tows 16 from the matrix material under applied stress, or the like. In some examples, woven fiber preform 10 may be acquired in prefabricated form or initially processed independent of the densification or texturing techniques described herein.

Figure 2A:
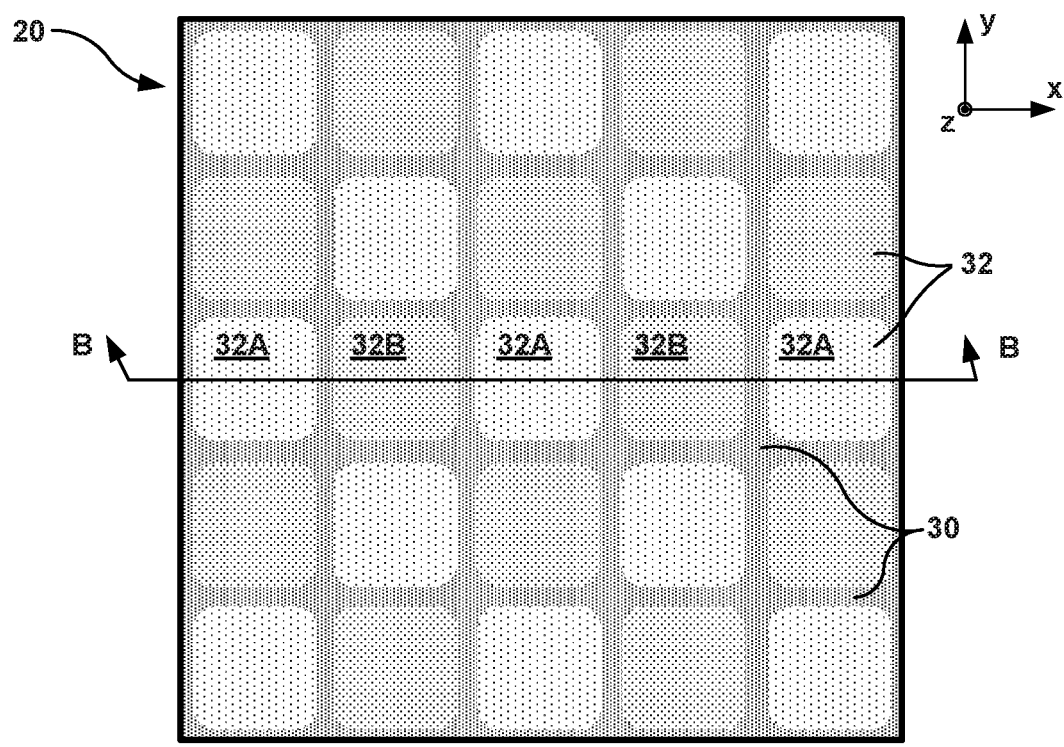
FIGS. 2A-2C are schematic views of an example composite component prepared from the woven fiber preform of FIGS. 1A and 1B.
Figure 2B:
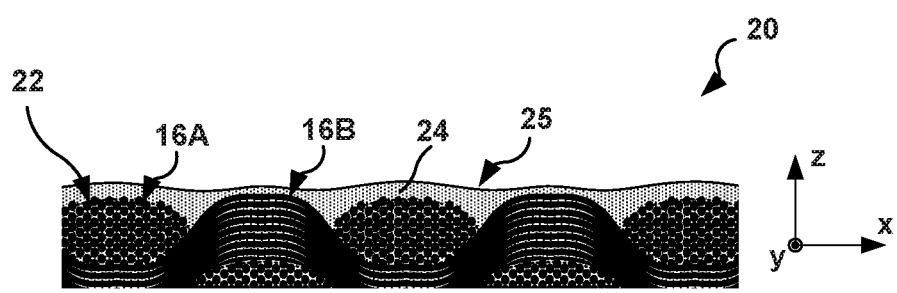
Figure 2C:
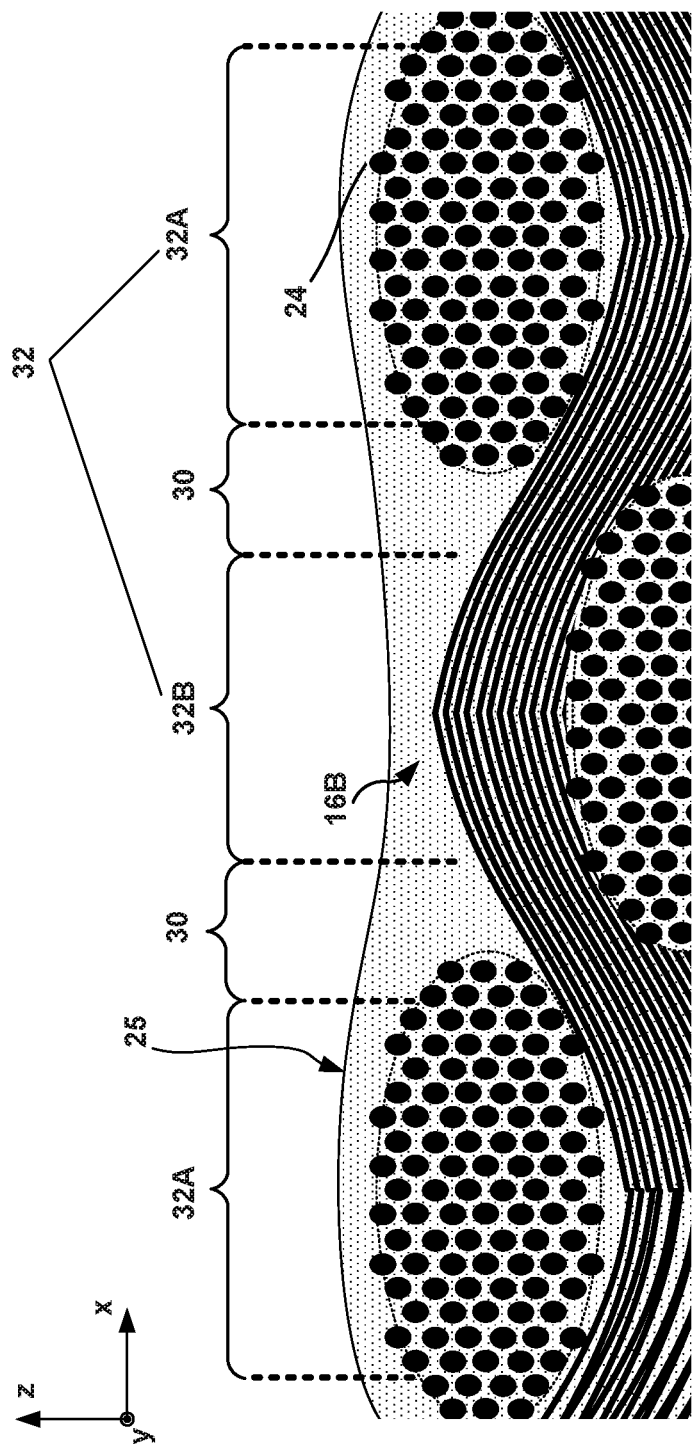

Once woven fiber preform 10 has been formed using either the techniques described above or any other suitable technique, woven fiber preform 10 may be subsequently densified with a matrix material and converted into a composite component (e.g., a fiber-reinforced CMC). FIGS. 2A-2C are schematic views of an example composite component 20 prepared from woven fiber preform 10. FIG. 2A is top-down view of composite component 20, FIG. 2B is a cross-sectional view of composite component 20 taken through line B-B of FIG. 2A, and FIG. 2C is an enlargement of a section of FIG. 2B. Composite component 20 is an example of a composite that includes a subsurface structure 22 (e.g., a woven fiber substrate) and a coating on the subsurface structure 22 (e.g., second phase material 24).

Composite component 20 includes a subsurface structure 22 (e.g., the fibers 12 of woven fiber preform 10 post second phase material 24 infiltration and/or pyrolyzation) and second phase material 24. Second phase material 24 may include a matrix material of the resultant CMC such as, for example, carbon, silicon carbide (SiC), silicon carbide aluminum boron silicide, silicon nitride ($Si_3N_4$), alumina ($Al_2O_3$), aluminosilicate, silica ($SiO_2$), or the like. In some examples, second phase material 24 of composite component 20 may include carbon, boron carbide, boron nitride, or resin (epoxy/polyimide). In some examples, second phase material 24 may be combined with additional reinforcement materials including, for example, discontinuous whiskers, platelets, or particulates composed of SiC, $Si_3N_4$, $Al_2O_3$, aluminosilicate, $SiO_2$, or the like. In some examples, second phase material 24 may include metal alloy that includes silicon, such as molybdenum-silicon alloy (e.g., $MoSi_2$), or niobium-silicon alloy (e.g., $NbSi_2$).

Composite component 20 may be a component for (e.g., CMC article) for a high temperature mechanical system. In some examples, composite component 20 may be a component for a gas turbine engine configured to operate in high temperature environments, e.g., operating at temperatures of 1900° to 2100° F. where the component is exposed to hot gases. Representative gas turbine engine components may include, but not limited to, seal segments, blade tracks, airfoils, blades, vanes, combustion chamber liners, or the like.

Composite component 20 may be produced using any suitable means. For example, composite component 20 may be produced by infiltrating or impregnating woven fiber preform 10 with second phase material 24 using resin transfer molding (RIM), chemical vapor infiltration (CVI), chemical vapor deposition (CVD), slurry infiltration, melt infiltration, or the like and/or heat treated to produce composite component 20. In some examples, fiber interface material 14 from woven fiber preform 10 may be pyrolyzed and contribute to at least a portion of second phase material 24.

In some examples, composite component 20 may be formed using a slurry infiltration technique followed by silicon melt infiltration. For example, using woven fiber preform 10, the preform may be infiltrated with one or more slurries comprising particles of a matrix precursor. Example precursor particles may include, but not limited to, particles of silicon carbide (SiC), silicon nitride ($Si_3N_4$), alumina ($Al_2O_3$), aluminosilicate (e.g., $Al_2Si_5$), silica ($SiO_2$), boron carbide ($B_4C$), molybdenum carbide ($Mo_2C$), carbon (e.g., carbon black or diamond particles), or combinations thereof. In some examples, the precursor particles may include at least one type of ceramic particle (e.g., SiC, $Si_3N_4$, $B_4C$, or $Mo_2C$ particles) mixed with carbon particles (e.g., carbon black or diamond particles). During the subsequent melt infiltration process, the carbon particles may react with the molten infiltrant to produce a ceramic material (e.g., react with molten silicon to form SiC). The particles of the slurry and the melt infiltrant material upon infiltration and/or reaction form second phase material 24.

In some examples, the slurry particles may be selected to include substantially the same (e.g., the same or nearly the same) components used to form portions of woven fiber preform 10 (e.g., fibers 12). For example, in some examples where fibers 12 include SiC fibers, the slurry particles may likewise include SiC particles or SiC precursor materials (e.g., silicon particles and/or carbon particles) which may react to form SiC during the subsequent melt infiltration process. In this way, the slurry particles may be compatible with fibers 12 and reduce potential stresses exerted within the final composite component 20 that may otherwise result due to thermal expansion mismatches associated with different materials.

Composite component 20 may define an undulated exterior surface 25 formed by a coating over subsurface structure 22 (e.g., coating of second phase material 24). In some examples, the undulations of exterior surface 25 may mimic (e.g., substantially reproduce) the underlying architecture associated with subsurface structure 22. For example, exterior surface 25 may exhibit a plurality of peaks and valleys in a patterned two-dimensional array (e.g., in the x-y plane of 2A) directly attributed to the corresponding fiber architecture of the underlying weave pattern of the top fiber layer of subsurface structure 22 (e.g., the weave pattern of woven fiber preform 10 shown in FIG. 1A). In some examples, the undulations (e.g., peaks, valleys, and transitions therebetween) in exterior surface 25 may be attributed to the risers/sinkers of respective warp tows 16A or weft tows 16B and intersections 18.

As described further below, one or more additional coatings (e.g., a bond coat, an environmental coating, a thermal barrier coating, or the like, or combinations thereof) may be on exterior surface 25. In some examples, adhesion between exterior surface 25 and the one or more additional coatings may be improved by texturing exterior surface 25. For example, exterior surface 25 of composite component 20 may undergo a microtexturing process wherein a plurality of microtextures, such as microchannels or depressions (e.g., microtextures 40 of FIG. 3) are formed in exterior surface 25. In some examples, each microtexture may define a respective depth (e.g., distance as measured in the z-direction of FIG. 2B). The formation such microtextures in surface 25 may help increase the bond strength, adhesion characteristics, stress characteristics, or combinations thereof between composite component 20 and the one or more additional coatings applied thereto.

In some examples, increasing the bore depth (e.g., bore distance in the z-axis direction of FIG. 2B) of the microtextures will increase the bonding strength or the adhesion characteristics between composite component 20 and the subsequent coating layer. However, if the bore depth of a respective microtexture extends too far into surface 25 of composite component 20, fibers 12 of the underlying subsurface structure 22 may become inadvertently exposed or damaged by the microtexture.

Exposed portions of the underlying subsurface structure 22 may be particularly prone to certain environmental attacks, such as oxidative degradation or other chemical attacks, during operation of composite component 20 in high temperature environments, Such degradation may lead to cracking, formation of undesirable reaction products, increased stress, delamination between fibers 12, tows 16, layers of fibers 12, or the like. Leaving a sufficient coating of second phase material 24 over fibers 12 may be useful to reduce or prevent such forms or environmental attack against subsurface structure 22.

Due to the undulated nature of surface 25 as well as the variable thickness of second phase material 24 (e.g., distance from surface 25 to underlying fibers 12 of subsurface structure 22 as measured in the z-direction of FIG. 2B) it may be difficult to apply a regular pattern of microtextures to surface 25 that increases the bore depth of the respective microtextures as well as avoids potentially damaging or exposing the underlying fibers 12 by having the bore depth extend too far into surface 25. As described further below, the adaptive microtexturing process described herein may be used to initially image the outer surface 25 of composite component 20 and use the image to identify structural features attributable to the fiber architecture of subsurface structure 22 (e.g., the geometry of the subsurface structure). Based on the image, outer surface 25 may be sectioned or divided into different regions that are characteristic of different types of underlying fiber architectures that result in comparatively different coating thicknesses of second phase material 24. For example, the relative thickness of second phase material 24 may vary across the surface of composite component 20 depending on whether the underlying fiber architecture of subsurface structure 22 within a respective region includes a riser/sinker of a respective warp tow 16A or weft tow 16B, includes an intersection 18, or includes other structural features. A microtexturing pattern may then be implemented across surface 25 that produces microtextures with comparatively different average bore depths depending on which region the microtexturing is being implemented.

As shown in FIG. 2A, outer surface 25 may be divided up into at least first region 30 that has a comparatively high thickness of second phase material 24 and least one additional region 32 that has a comparatively low thickness of second phase material 24 and is positioned adjacent to first region 30. First region 30 with the comparatively high thickness of second phase material 24 may be characterized as the portions of surface 25 positioned over intersections 18 of the underlying subsurface structure 22 (e.g., the boundary lines where a respective warp tow 16A interests to begin passing underneath a corresponding weft 16B, or vice versa, as observed from overhead). At least one additional region 32 with the relatively low thickness of second phase material 24 compared to first region 30 may be characterized as the portions of surface 25 positioned over riser configuration of respective tows 16 of underlying subsurface structure 22, the portions of surface 25 positioned over sinker configuration of respective tows 16 of underlying subsurface structure 22, or both. In some examples at least one additional region 32 may be subdivided into regions positioned over riser configurations of a respective warp tows 16A (referred to herein as "warp-riser regions 32A" or "second regions 32A") and include one or more regions positioned over riser configurations of a respective weft tows 16B (referred to herein as "weft-riser regions 32B or third regions 32B"). In some examples, respective warp-riser regions 32A or weft-riser regions 32B may each identify a plurality of respective warp-riser regions 32A or weft-riser regions 32B. The respective warp-riser regions 32A or weft-riser regions 32B may extend contiguously or non-contiguous across surface 25 depending on the weave pattern of subsurface structure 22.

Due to the fiber architecture of subsurface structure 22 and the manner in which second phase material 24 is infiltrated into subsurface structure 22, the warp-riser regions 32A and weft-riser regions 32B may represent portions of composite component 20 where the underlying fibers 12 of subsurface structure 22 are relatively close to surface 25 and thus result in regions of relatively low thicknesses of second phase material 24. In contrast, first region 30 may represent portions of composite component 20 where the underlying fibers 12 are set further back from surface 25 comparatively and thus result in regions of relatively low thicknesses of second phase material 24.

In some examples, first region 30 may define a pattern that extends substantially contiguously (e.g., contiguously or nearly contiguously) over surface 25. For example, in some examples where the uppermost layer of subsurface structure 22 (e.g., the layer responsible for the undulations of outer surface 25) includes a plain weave pattern, first region 30 may resemble an octothorpe (e.g., #) or mesh pattern over surface 25 where first region 30 corresponds to the lines of the octothorpe or mesh pattern and the cells correspond to warp-riser and weft-riser regions 32A and 32B (e.g., as shown in FIG. 2A). In such examples, the lines of the octothorpe or mesh pattern corresponding to first region 30 may be aligned substantially parallel (e.g., parallel or nearly parallel) with warp and weft weave directions. In other examples, first region 30 may resemble different shapes including for example, a box, a cross, a stairstep (e.g., associated with a twill weave pattern), or other shape based on the pattern of underlying intersections 18 in woven fiber substrate 12. In some examples, first region 30 may be divided into a plurality of non-contiguous regions distributed over surface 25 in an organized (e.g., non-random) pattern.

In some examples, warp-riser regions 32A and weft-riser regions 32B may be substantially similar to one another such that the thickness of second phase material 24 within the respective regions are substantially the same (e.g., the same or nearly the same). For examples, the apex or center point of each respective warp or weft-riser configurations by be at similar heights across subsurface structure 22 such that the coating thickness of second phase material 24 over the warp and weft risers may be considered the same and may be identified as one-type of region 32 for the purposes of forming microtextures 40 with the same average bore depth. In other examples, the apex or center points of respective warp and weft-riser configurations may be at different heights and thus result in the coating thickness of second phase material 24 over the warp and weft-riser configurations being comparatively different.

As shown in FIG. 2A, warp-riser regions 32A and weft-riser regions 32B are distributed in an alternating, non-contiguous, 2-dimensional array over outer surface 25 with each respective warp-riser regions 32A and weft-riser regions 32B being positioned adjacent to a portion of first region 30. In other examples, such as with other types of weave patterns, warp-riser regions 32A and weft-riser regions 32B may define different shapes, may be continuous or non-continuous over surface 25, or may be distributed in other organized or non-random patterns over surface 25.

Figure 3:
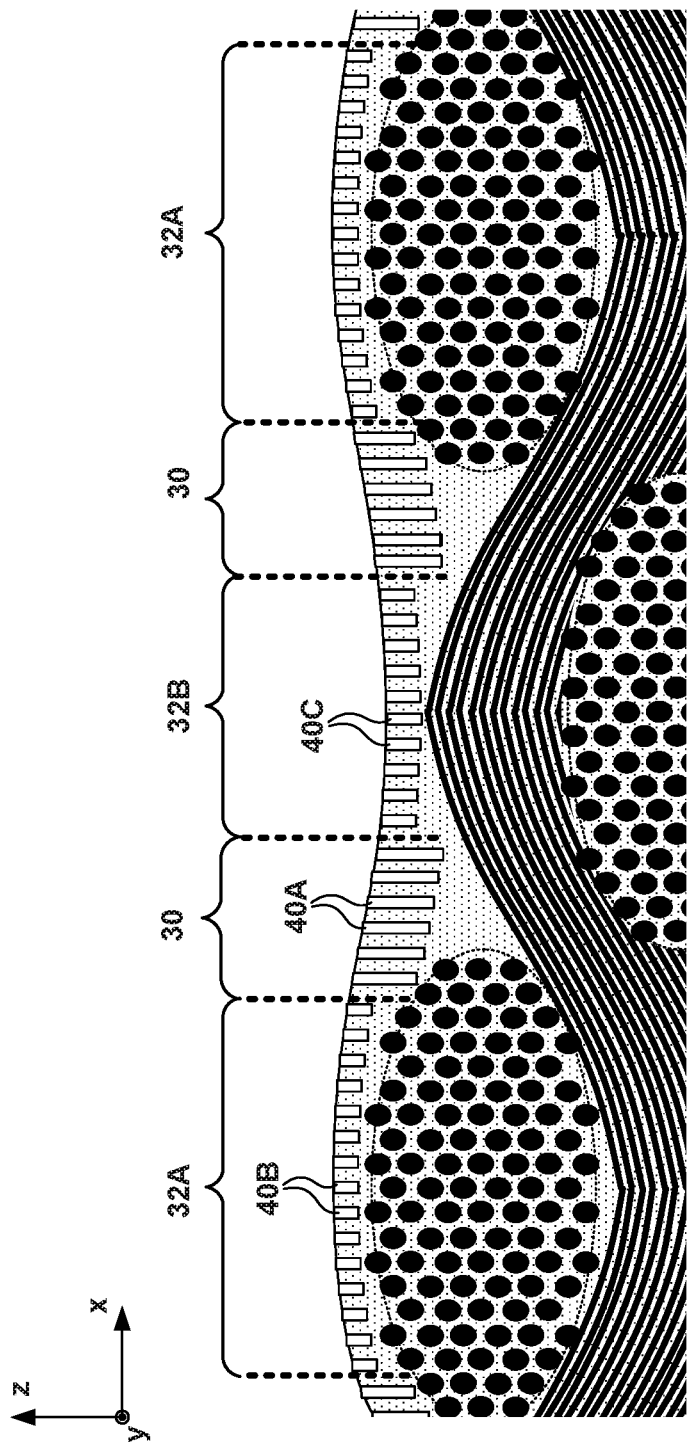
FIG. 3 is schematic cross-sectional view of the composite component of FIG. 2C with a plurality of microtextures formed within different regions of the outer surface.

By identifying such distinctive regions and sectioning surface 25 into the different described regions, microtextures can be formed in outer surface 25 that define differing average bore depths depending on which region (e.g., first region 30, second region 32A, or third region 32B) the microtextures are formed. FIG. 3 is schematic cross-sectional view of composite component 20 of FIG. 2C with a plurality of first, second, and third microtextures 40A, 40B, and 40C (collectively "microtextures 40" or individually "microtexture 40") formed within first, second, and third regions 30, 32A, and 32B respectively.

Each microtexture 40 may be characterized by a bore width (e.g., a maximum width in the x-y plane of FIG. 3) and a bore depth (e.g., distance in the z-axis direction of FIG. 3). In some examples, microtextures 40 may be cylindrical shaped with an average bore width or average bore diameter of less than about 250 μm (e.g., between about 70 μm to about 210 μm).

Within the different sectioned regions (e.g., first region 30, second region 32A, and third region 32B), the bore depth of microtextures 40 may be selected such that the average bore depth of microtextures 40 among the respective regions are comparatively different. For example, within first region 30, because the thickness of second phase material 24 will be comparatively large due to the underlying intersections 18 of subsurface structure 22, a first plurality of microtextures 40A may define a first average bore depth that is larger by comparison than the average bore depths of microtextures 40B and 40C of second region 32A or third region 32B. The average bore depth of microtextures 40A within first region 30 may be comparatively large because the underlying intersections 18 allow or a larger accumulation of second phase material 24 and greater coating thickness.

The average bore depth of first plurality of microtextures 40A within first region 30 may be of any suitable depth. In some examples, the average bore depth of microtextures 40A may be between about 10 micrometers (μm) and about 100 μm; however, other suitable depths may be used depending on the thickness of second phase material 24 over tows 16. In some examples, a suitable depth for microtextures 40A may be determined experimentally by taking a cross-section of a representative composite component 20 and measuring the thickness of second phase material 24 within the different regions, e.g., intersections 18 and regions including warp-riser or weft-riser configurations, associated with the underlying fiber architecture of subsurface structure 22.

As described above, the second and third regions 32A and 32B may corresponded with the warp-riser and weft-riser regions 32A and 32B respectively of the underlying subsurface structure 22. In the warp-riser and weft-riser regions 32A and 32B the accumulation of second phase material 24 may be relatively small compared to first region 30, resulting in a lower coating thickness of second phase material 24 over tows 16. The average bore depth of microtextures 40B and 40C within second and third regions 32A and 32B may be of any suitable depth and comparatively less than the average bore depth of microtextures 40A. In some examples, a suitable depth for microtextures 40B and 40C may be determined experimentally by taking a cross-section of a representative composite component 20 and measuring the thickness of second phase material 24 within the warp-riser and weft-riser regions 32A and 32B. In some examples, the average bore depth of microtextures 40B and 40C may be greater than 0.1 μm and less than about 10 μm. In some examples, the average bore depths of microtextures 40B and 40C may be substantially the same (e.g., the same or nearly the same) while in other examples, the average bore depths of microtextures 40B and 40C may be different. For example, weft tows 16B may form weft-riser configurations that rise to a height less than the height of the warp-riser configurations formed by warp tows 16A (e.g., a height relative to the x-y plane of FIG. 3) or vice versa. In such examples, microtextures 40B may define an average bore depth less than that of microtextures 40C or vice versa. For example, microtextures 40B may defined an average bore depth of about 0.1 μm to about 5 μm and microtextures 40C may defined an average bore depth of about 5 μm to about 10 μm; however, other suitable bore depths may also be used.

Microtextures 40 may be formed using any suitable technique. In some examples, microtextures 40 may be formed using a laser ablation technique in which portions of second phase material 24 of composite component 20 are removed via vaporization to create a microchannel or depression in outer surface 25 of second phase material 24. The laser ablation process may be performed using any suitable ablation laser. In some examples, the laser may be configured to have a beam frequency of less than about 200 Hz, a beam power of about 15 W to about 25 W, and a defocus value of about −60 to about 50, however other suitable configurations may also be used.

In some examples, compared to mechanical machining, a laser ablation process may significantly reduce the chance of composite component 20 becoming cracked during the formation of microtextures 40 by reducing the mechanical force applied to outer surface 25 during processing. Additionally, or alternatively, in some examples, due to the relatively small amount of material removed by the laser, the amount of heat applied and/or generated on outer surface 25 may remain relatively low during the formation of microtextures 40 compared to other machining techniques. By reducing the heat applied and/or generated on composite component 20 during the laser ablation process, the chance of the material of composite component 20 (e.g., fibers 12)

becoming oxidized prior to the application of the one or more subsequent coatings may be significantly reduced compared to other processing techniques.

In some examples, the laser may be configured to form microtextures 40 in outer surface 25 even though outer surface 25 is non-planar. For example, the laser ablation system may be configured to adjust the incident height or angle between the ablation beam and outer surface 25 to produce microtextures 40. In some examples, one or more of microtextures 40 may be angled relative to the general plane of outer surface 25 (e.g., the x-y plane of FIG. 3). In such examples, microtextures 40 may be angled by as much 45° relative to the normal of the general plane of outer surface 25 (e.g., relative to the z-axis of FIG. 3).

In some examples, during the ablation process, portions of the removed second phase material 24 may re-solidify on surface 25 to form castoffs or other textures around the perimeter of a formed microtextures 40. In some such examples, the textures may help improve the mechanical interlock with the subsequent coating layer applied to fiber-reinforced substrate 20.

Figure 4:
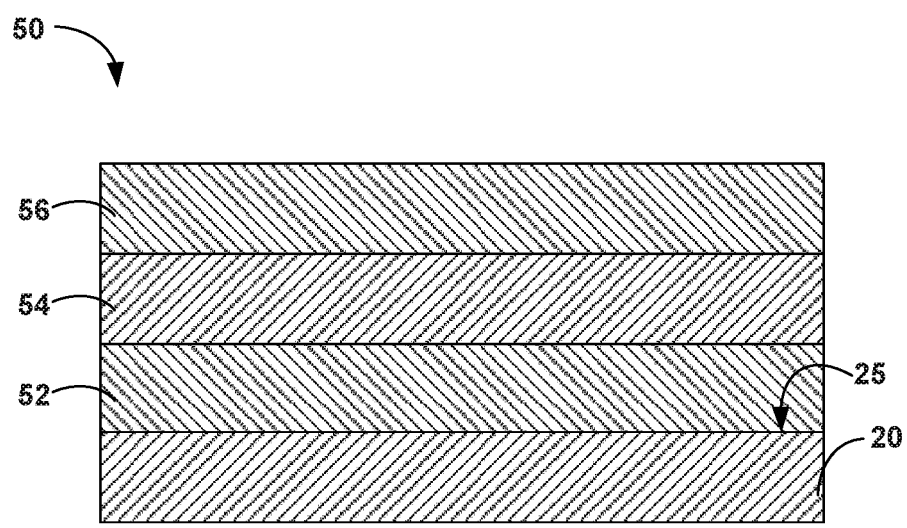
FIG. 4 is schematic diagram illustrating a cross-sectional view of a CMC article including the composite component of FIG. 3 with one or more optional coatings on the outer surface of the composite component.

Once microtextures 40 have been formed in composite component 20, the resultant article may be coated with one or more optional outer coatings applied to outer surface 25. FIG. 4 is schematic diagram illustrating a cross-sectional view of a CMC article 50 including composite component 20 with microtextures 40 as described above (not shown) formed along surface 25 with one or more optional coatings on surface 25. The one or more optional coatings may include, for example, a bond coat 52, an environmental barrier coating (EBC) 54, an abradable coating layer 56, or the like.

In some examples, CMC article 50 may include bond coat 52 on composite component 20 that includes any useful material to improve adhesion between composite component 20 and/or EBC. In some examples, bond coat 52 may include silicon, alone, or mixed with at least one other constituent including, for example, at least one of a transition metal carbide, a transition metal boride, or a transition metal nitride; mullite (aluminum silicate, $Al_6Si_2O_{13}$), silica, a silicide, a rare earth silicate, a rare earth oxide, or the like. Bond coat 52 may be formed on outer surface 25 using, for example, plasma spraying, physical vapor deposition (PVD), electron beam physical vapor deposition (EB-PVD), directed vapor deposition (DVD), chemical vapor deposition (CVD), cathodic arc deposition, slurry deposition, sol-gel deposition, electrophoretic deposition, or the like.

Additionally, or alternatively, the one or more optional outer coatings on composite component 20 may include EBC 54, which may provide environmental protection, thermal protection, and/or CMAS-resistance to CMC article 50. EBC 54 may include at least one of a rare earth oxide, a rare earth silicate, an aluminosilicate, or an alkaline earth aluminosilicate. For example, EBC 54 may include mullite, barium strontium aluminosilicate (BSAS), barium aluminosilicate (BAS), strontium aluminosilicate (SAS), at least one rare earth oxide, at least one rare earth monosilicate ($RE_2SiO_5$, where RE is a rare earth element), at least one rare earth disilicate ($RE_2Si_2O_7$, where RE is a rare earth element), or combinations thereof. The rare earth element in the at least one rare earth oxide, the at least one rare earth monosilicate, or the at least one rare earth disilicate may include at least one of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium), La (lanthanum), Y (yttrium), or Sc (scandium).

In some examples, the at least one rare earth oxide includes an oxide of at least one of Yb, Y, Gd, or Er.

In some examples, EBC 54 may include at least one rare earth oxide and alumina, at least one rare earth oxide and silica, or at least one rare earth oxide, silica, and alumina. In some examples, EBC 54 may include an additive in addition to the primary constituents of the coating. For example, EBC 54 may include at least one of $TiO_2$, $Ta_2O_5$, $HfSiO_4$, an alkali metal oxide, or an alkali earth metal oxide.

In some examples, EBC 54 may be substantially free (e.g., free or nearly free) of hafnia and/or zirconia. Zirconia and hafnia may be susceptible to chemical attack by CMAS, so an EBC 54 substantially free of hafnia and/or zirconia may be more resistant to CMAS attack than EBC 54 that includes zirconia and/or hafnia.

In some examples, EBC 54 may have a dense microstructure, a columnar microstructure, or a combination of dense and columnar microstructures. A dense microstructure may be more effective in preventing the infiltration of CMAS and other environmental contaminants, while a columnar microstructure may be more strain tolerant daring thermal cycling. A combination of dense and columnar microstructures may be more effective in preventing the infiltration of CMAS or other environmental contaminants than a fully columnar microstructure while being more strain tolerant during thermal cycling than a fully dense microstructure. In some examples, EBC 54 with a dense microstructure may have a porosity of less than about 20 vol. %, such as less than about 15 vol. %, less than 10 vol. %, or less than about 5 vol. %, where porosity is measured as a percentage of pore volume divided by total volume of EBC 54.

Additionally, or alternatively, the one or more optional outer coatings on composite component 20 may include an abradable layer 56. The abradable layer may include any of the materials described above for EBC.

Abradable layer 56 may be porous. Porosity of abradable layer 56 may reduce a thermal conductivity of the abradable layer and/or may affect the abradability of the layer. In some examples, abradable layer 56 includes porosity between about 10 vol. % and about 50 vol. %. In other examples, abradable layer 56 includes porosity between about 15 vol. % and about 35 vol. %, or about 20 vol. %. Porosity of abradable layer 56 is defined herein as a volume of pores or cracks in the abradable layer divided by a total volume of the abradable layer (including both the volume of material in the abradable layer and the volume of pores/cracks in the abradable layer). Porosity in abradable layer 56 may be formed by controlling the parameters used to thermally spray abradable layer 56, by using a coating material additive that is later removed from abradable layer 56 to define porosity, or combinations thereof.

Figure 5:
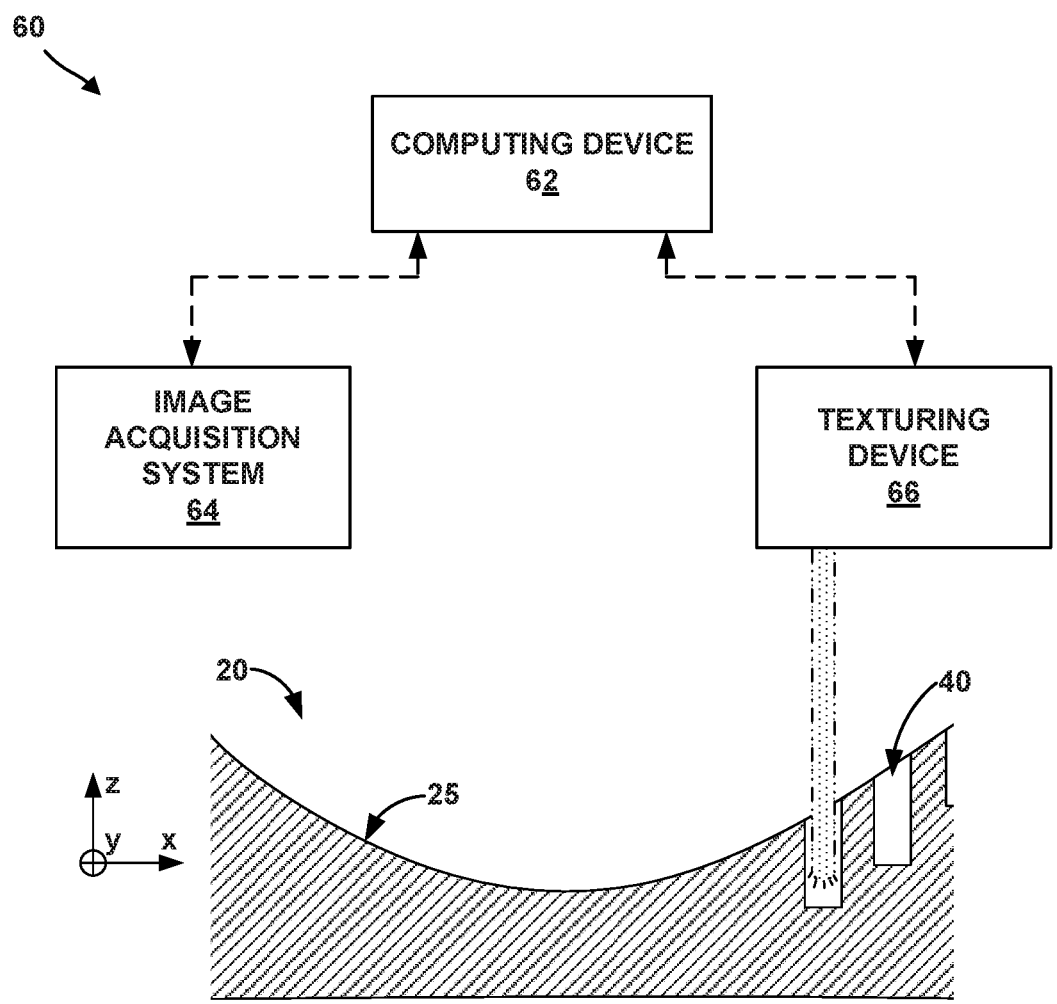
FIG. 5 is a conceptual block diagram illustrating an example system for performing a microtexturing technique on the outer surface of the composite component of FIGS. 2A-2C.

FIG. 5 is a conceptual block diagram illustrating an example system 60 for performing a microtexturing technique on outer surface 25 of composite component 20. System 60 may include a computing device 62, image acquisition system 64, and a texturing device 66. Computing device 62 is operably connected to both image acquisition system 64 and texturing device 66 to perform microtexturing techniques described herein.

In some examples, one or both of image acquisition system 64 and texturing device 66 may be moveable relative to outer surface 25 via the use of a movable work platform that receives composite component 20 or movable arms connected to image acquisition system 64 or texturing device 66 and operated by computing device 62.

Computing device 62 may include, for example, a desktop computer, a laptop computer, a workstation, a server, a mainframe, a cloud computing system, or the like. In some examples, computing device 62 controls the operation of system 60 in response to user input via a user interface. Computing device 62 may also include one or more processors, storage devices, communication units, or the like configured to implement process instructions for execution by image acquisition system 64 and texturing device 66. For example, the processor of computing device 62 may be capable of processing instructions stored by storage device to use image acquisition system 64 capture a digital image of outer surface 25, determine an underlying structure of composite component 20 based on the acquired image, section outer surface 25 into different regions, and used texturing device 66 to form microtextures 40 within outer surface 25 having different average bore depths based on the specified regions. Examples of processors for computing device 62 may include, any one or more of a microprocessor, a controller, a digital signal processor (DSP), an application specific integrated circuit (ASIC), a field-programmable gate array (FPGA), or other digital logic circuitry. The techniques performed by computing device 62 (e.g., described further below in FIG. 6) may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. The storage device(s), in some examples, include a computer-readable storage medium or computer-readable storage device. In some examples, the storage device may include a volatile memory such as random access memories (RAM), dynamic random access memories (DRAM), static random access memories (SRAM), or other forms of volatile memories known in the art. In some examples, the storage device may be used to store program instructions for execution by computing device 62.

Such hardware, software, and firmware of computing device 62 may be implemented within the same device or within separate devices to support the various techniques described in this disclosure. In addition, any of the described units, modules or components may be implemented together or separately as discrete but interoperable logic devices.

Image acquisition device 62 may include any suitable system that can be used to acquire a digital image of outer surface 25 of texturing device 66. In some examples, image acquisition device 62 may include one or more digital imaging devices such as confocal laser scanning microscopy (CLSM) configured to obtain digitized optical images of outer surface 25 of composite component 20 in response to the performance of an image acquisition protocol. In some examples, using CLSM may include capturing multiple two-dimensional images of outer surface 25 at different depths to develop a three-dimensional or topographical map of the undulated nature of outer surface 25.

Texturing device 66 may include, for example, an ablation laser configured to form macrotextures 40 of a desired depth on outer surface 25 texturing device 66 within a specified region (e.g., first, second, or third regions 30, 32A, or 32B). In some examples, the operating parameters of the ablation laser may be configured to have a beam frequency of less than about 200 Hz, a beam power of about 15 W to about 25 W, and a defocus value of about −60 to about 50.

Figure 6:
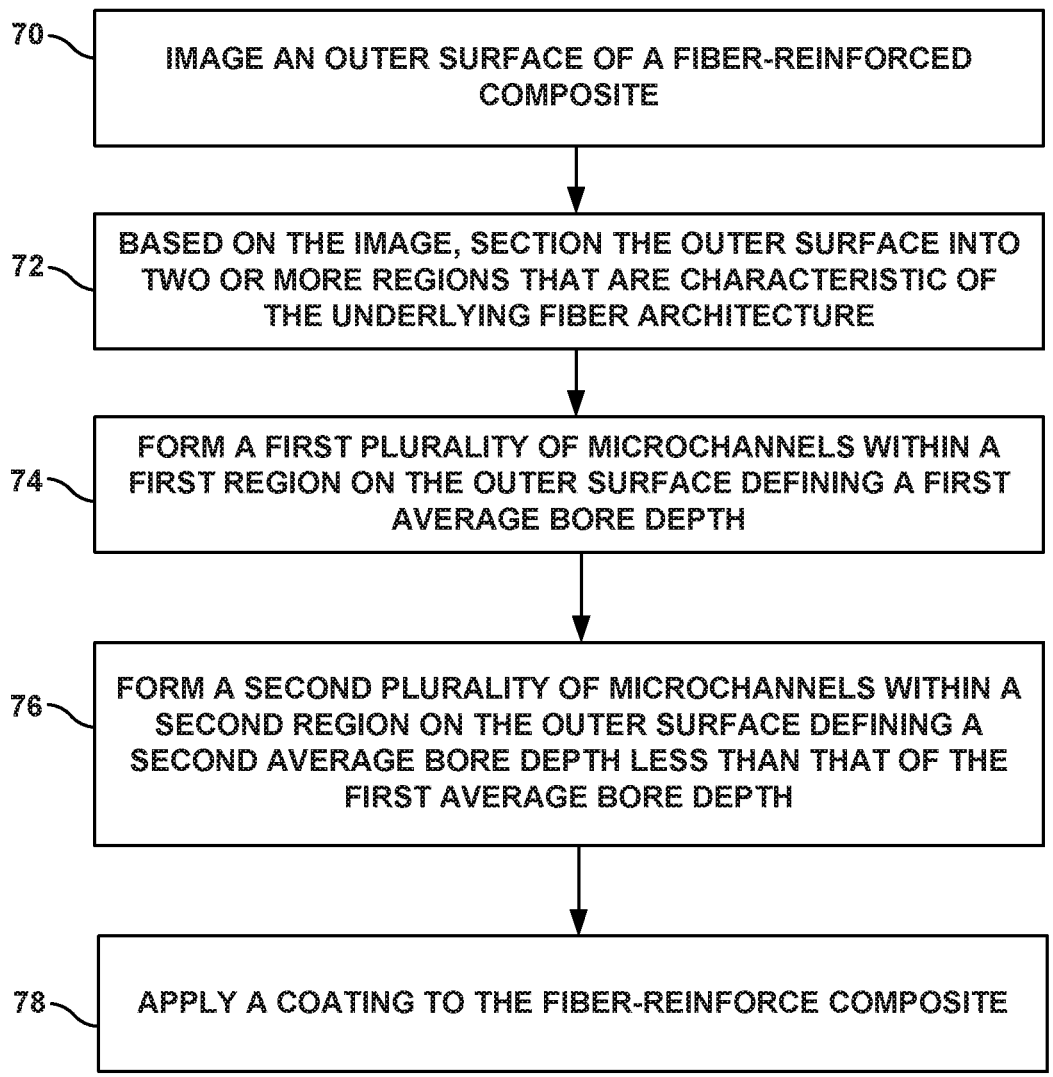
FIG. 6 is a flow diagram illustrating example technique for forming composite component including microtextures formed on the outer surface of the composite component.

FIG. 6 is a flow diagram illustrating example technique for forming composite component 20 including microtextures 40 formed on the outer surface 25 using system 60 of FIG. 5. While the technique of FIG. 6 is described with respect to composite component 20 of FIGS. 2A-4 and system 60 of FIG. 5, in other examples, the techniques of FIG. 6 may be used to form other articles, formed with other systems, or composite component 20 may be formed using a technique different than that described in FIG. 6.

The technique of FIG. 6 includes imaging outer surface 25 of composite component 20 (70); sectioning outer surface 25 of composite component 20 into two or more regions 30, 32A, 32B that are characteristic of the underlying fiber architecture of subsurface structure 22 (72); forming first plurality of microtextures 40A within first region 30 on outer surface 25 that defines a first average bore depth (74); forming second plurality of microtextures 40B within second region 32A on outer surface 25 that defines a second average bore depth less than that of the first average bore depth (76); and optionally applying one or more additional coatings 52, 54, or 56 on surface 25 (78).

As described above, composite component 20 may include a subsurface structure (e.g., subsurface structure 22) comprising a plurality of tows 16 woven together with each tow 16 including a plurality of fibers 12, and second phase material 24 embedded within subsurface structure 22 and forming a coating on the subsurface structure 22 that defines outer surface 25. Due to the fiber architecture of subsurface structure 22, outer surface 25 will be undulated and define regions of matrix materials 25 with different relative thicknesses.

Using any suitable image acquisition system 64, outer surface 25 of composite component 20 may be imaged (70). For example, computing device 62 may cause image acquisition system 64 to capture one or more images of outer surface 25. Image acquisition system 64 and/or computing device 62 may then initiate an image inspection protocol to identify characteristic structural features of the subsurface structure 22. In some examples, the image inspection protocol may be an automated process that uses image processing algorithms, such as a confocal microscopy, and techniques implemented in system software of computing device 62 to perform a non-destructive evaluation of outer surface 25. For example, using an appropriate inspection protocol, one or more images of outer surface 25 may be taken by image acquisition system 64. Once computing device 62 acquires the digital image of outer surface 25, various inspection protocols may be initiated to preform analysis of the image using computing device 62, for example, to assess topology of outer surface 25 and identify the presence of one or more characteristic underlying structures (e.g., intersections 18, warp-riser configurations, or weft-riser configurations). In some examples, image acquisition system 64 may perform confocal laser scanning microscopy (CLSM) on outer surface 25 to take multiple two-dimensional images of outer surface 25, captured at different depths, to develop a three-dimensional or topographical map of the undulated nature of outer surface 25.

With the image acquired, the image acquisition system 64 and/or computing device 62 may identify the presence of one or more characteristic underlying structures (e.g., intersections 18, warp-riser configurations, or weft-riser configurations) using, for example, the topology of outer surface 25. For example, warp or weft-riser regions 32A or 32B may register as repeating shapes (e.g., square shapes in a plain weave pattern) approximately uniformly distributed in a two-dimensional array across the outer surface 25. Warp or weft-riser regions 32A or 32B may be raised or lowered relative to each other to establish readily identifiable structures in the acquired image of outer surface 25.

Based on the acquired image, image acquisition system 64 and/or computing device 62 may then section outer surface 25 into two or more regions (e.g., first, second, and third regions 30, 32A, and 32B) that are associated with the underlying fiber architectures identified in the acquired image (72). For example, image acquisition system 64 and/or computing device 62 may divide outer surface 25 into first region 30 that indicates underlying tow 16 intersections 18 underneath the surface and second and third regions 32A and 32B that are indicative of underlying warp and weft-riser configurations underneath. As described above, due to the characteristics of the underlying fiber architecture of subsurface structure 22 and infiltration techniques used, the thickness of second phase material 24 will be different within the different sectioned regions 30, 32A, 32B.

The technique of FIG. 6 also includes using computing device 62 to form first plurality of microtextures 40A within first region 30 on outer surface 25 that defines a first average bore depth (74) and forming second plurality of microtextures 40B within second region 32A on outer surface 25 that defines a second average bore depth less than that of the first average bore depth (76). For example, computing device 62 may cause texturing device 66 to form first plurality of microtextures 40A within first region 30 on outer surface 25 that defines a first average bore depth (74) and form second plurality of microtextures 40B within second region 32A on outer surface 25 that defines a second average bore depth less than that of the first average bore depth (76). In some examples, the formation of microtextures 40 may also include a third plurality of microtextures 40C within third region 32B on outer surface 25 that defines a third average bore depth less than that of the first average bore depth and different than that of the second average bore depth. As described above, microtextures 40 may be formed using texturing device 66 (e.g., an ablation laser or milling device) to create microchannels or depressions in outer surface 25 with the average bore depth of microtextures 40 being selected based on which sectioned region (e.g., first region 30, second region 32A, or third region 32B) microtextures 40 are being formed. First region 30 may be indicative of underlying tow 16 intersections 18 that define a thickness which is comparatively large compared to either second or third regions 32A and 32B. Accordingly, microtextures 40A formed within first region 30 will define an average bore depth that is larger than the average bore depths of microtextures 40B and 40C formed in either of second or third regions 32A or 32B.

In some examples, the techniques performed by computing device 62 described in this disclosure may also be embodied or encoded in an article of manufacture including a computer-readable storage media encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

The technique of FIG. 6 also includes forming at least one additional coating 52, 54, and/or 56 on outer surface 25 (78). As used herein, "formed on" and "on" means a layer or coating that is formed on top of another layer or coating and encompasses both a first layer or coating formed immediately adjacent a second layer or coating and a first layer or coating formed on top of a second layer or coating with one or more intermediate layers or coatings present between the first and second layers or coatings. In contrast, "formed directly on" and "directly on" denote a layer or coating that is formed immediately adjacent to another layer or coating, i.e., there are no intermediate layers or coatings.

The formation of microtextures 40 in outer surface 25 may increase the bonding strength or adhesion characteristics between the additional coating layers (e.g., bond coat 52) and outer surface 25 of composite component 20.

Various examples have been described. These and other examples are within the scope of the following claims.

The invention claimed is:

1. An article comprising:
a composite comprising:
a subsurface structure, wherein an uppermost layer of the subsurface structure comprises a pattern of structures; and
a second phase of material forming a coating on the subsurface structure, wherein a surface of the coating comprises a pattern of undulations that mimics the pattern of structures of the uppermost layer of the subsurface structure, and wherein the coating comprises:
a first region having a first average coating thickness, wherein the coating defines a first plurality of microtextures in an outer surface of the coating, the first plurality of microtextures comprising an average bore width of less than about 250 micrometers (μm) and a first average bore depth; and
a second region positioned adjacent to the first region and having a second average coating thickness that is less than the first average coating thickness, wherein the coating defines a second plurality of microtextures on the outer surface of the coating, the second plurality of microtextures comprising an average bore width of less than about 250 μm and a second average bore depth less than the first average bore depth.

2. The article of claim 1, wherein the subsurface structure comprises a woven fiber substrate comprising a plurality of tows woven together, wherein each tow of the plurality of tows comprises a plurality of fibers.

3. The article of claim 1, wherein the composite comprises a ceramic matrix composite (CMC), and wherein the second phase of material comprises at least one of carbon, silicon carbide (SiC), silicon carbide aluminum boron silicide, silicon nitride ($Si_3N_4$), alumina ($Al_2O_3$), aluminosilicate, or silica ($SiO_2$).

4. The article of claim 2, wherein the first region is positioned over intersects of the woven fiber substrate, wherein each intersect indicates a boundary line between two crossing tows.

5. The article of claim 1, wherein the first region is contiguous across the outer surface.

6. The article of claim 2, wherein the second region is positioned over a riser of a respective tow of the plurality of tows.

7. The article of claim 6, wherein the second region is centered over the riser of the respective tow of the plurality of tows.

8. The article of claim 1, wherein the second region is surrounded by the first region.

9. The article of claim 1, further comprising a plurality of the second regions, wherein within each respective region of the plurality of the second regions the coating defines the second plurality of microtextures.

10. The article of claim 9, wherein the plurality of the second regions are non-contiguous with respect to each other.

11. The article of claim 9, wherein the plurality of the second regions are arranged in a two-dimensional array on the outer surface.

12. The article of claim 2, further comprising a plurality of third regions, wherein within each respective third region of the plurality of third regions the coating defines a third plurality of microtextures on the outer surface of the coating, wherein the third plurality of microtextures comprises an average bore width of less than 250 μm and a third average bore depth less than the first average bore depth and different than the second average bore depth.

13. The article of claim 12, wherein the plurality of the second regions and the plurality of third regions are arranged in an alternating two-dimensional array on the outer surface.

14. The article of claim 12, wherein the plurality of tows comprises a plurality of weft tows woven with a plurality of warp tows, wherein the plurality of second regions are positioned over risers of respective warp tows and the plurality of second regions are positioned over risers of respective weft tows.

15. The article of claim 1, further comprising at least one of a bond coat, an environmental barrier coating, or a thermal barrier coating on the outer surface of the coating.

16. A method comprising:
imaging an outer surface of a composite comprising:
a subsurface structure, wherein an uppermost layer of the subsurface structure comprises a pattern of structures; and
a second phase of material forming a coating on the subsurface structure that defines the outer surface, wherein a surface of the coating comprises a pattern of undulations that mimics the pattern of structures of the uppermost layer of the subsurface structure;
based on imaging the outer surface of the composite, sectioning the outer surface into at least a first region and a second region adjacent to the first region, wherein the first region has a first average coating thickness and the second region has a second average coating thickness that is less than the first average coating thickness;
forming a first plurality of microtextures on the outer surface of the coating within the first region, the first plurality of microtextures comprising an average bore width of less than 250 μm and a first average bore depth; and
forming a second plurality of microtextures on the outer surface of the coating within the second region, the second plurality of microtextures comprising an average bore width of less than 250 μm and a second average bore depth less than the first average bore depth.

17. The method of claim 16, wherein the subsurface structure comprises a woven fiber substrate comprising a plurality of tows woven together, wherein each tow of the plurality of tows comprises a plurality of fibers.

18. The method of claim 17, wherein imaging the outer surface of the coating comprises creating a topographical map of the outer surface of the coating and identifying on the topographical map at least one of:
a plurality of intersects of the woven fiber substrate, wherein each intersect corresponds to a boundary line between two adjacent tows of the plurality of tows that are woven in different directions, or
one or more tow risers of the plurality of tows of the woven fiber substrate, wherein each tow riser corresponds to a region where a respective tow of the plurality of tows is woven over another respective tow of the plurality of tows.

19. The method of claim 16, further comprising forming at least one of a bond coat, an environmental barrier coating, or a thermal barrier coating on the outer surface of the coating.

* * * * *